No. 618,203. Patented Jan. 24, 1899.
W. H. HARFIELD.
WINDLASS.
(Application filed Oct. 31, 1898.)

(No Model.)

Witnesses
J. D. Kingsbury

Inventor
William H. Harfield
By Whitaker Prevost attys.

UNITED STATES PATENT OFFICE.

WILLIAM HORATIO HARFIELD, OF LONDON, ENGLAND.

WINDLASS.

SPECIFICATION forming part of Letters Patent No. 618,203, dated January 24, 1899.

Application filed October 31, 1898. Serial No. 695,041. (No model.)

*To all whom it may concern:*

Be it known that I, WILLIAM HORATIO HARFIELD, a subject of the Queen of Great Britain, residing at London, England, have invented new and useful Improvements in or Applicable to Windlasses, of which the following is a specification.

This invention relates to improvements in windlasses, and has for its object to provide the same with a differential warping arrangement.

In carrying out my invention I provide the windlass with an intermediate or counter-shaft driven from the engine-shaft and provided with a fixed warping drum or barrel of ordinary construction. The said counter-shaft is arranged to drive the main windlass-shaft at a slower speed through the medium of suitable gearing, and the main shaft has loosely mounted on it a warping drum or barrel provided with means, such as a pawl-and-ratchet arrangement, whereby it is rotated by the said main shaft when the latter is revolving in one direction. With this arrangement the rope is normally wound by the barrel on the counter-shaft, the barrel on the main shaft overrunning its driving-pawls; but directly the load on the counter-shaft barrel becomes too great it is taken up by the main-shaft barrel, which is then driven by the pawls.

Figure 1:
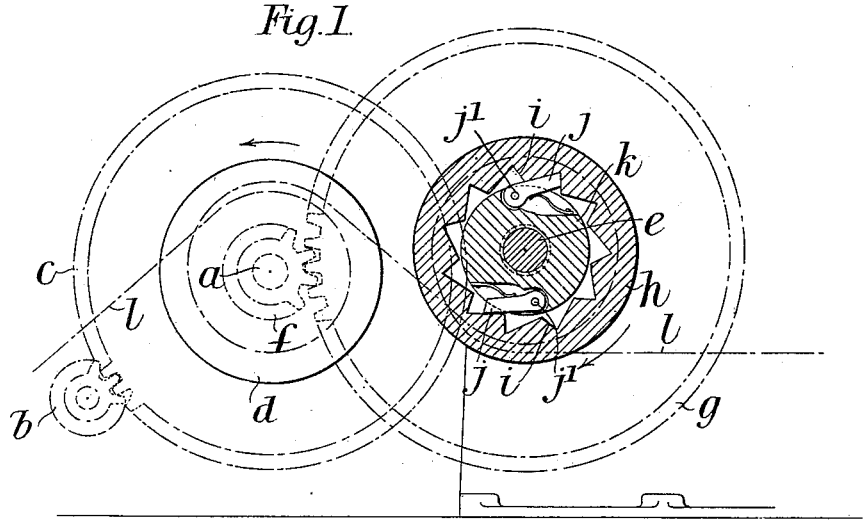
Figure 2:
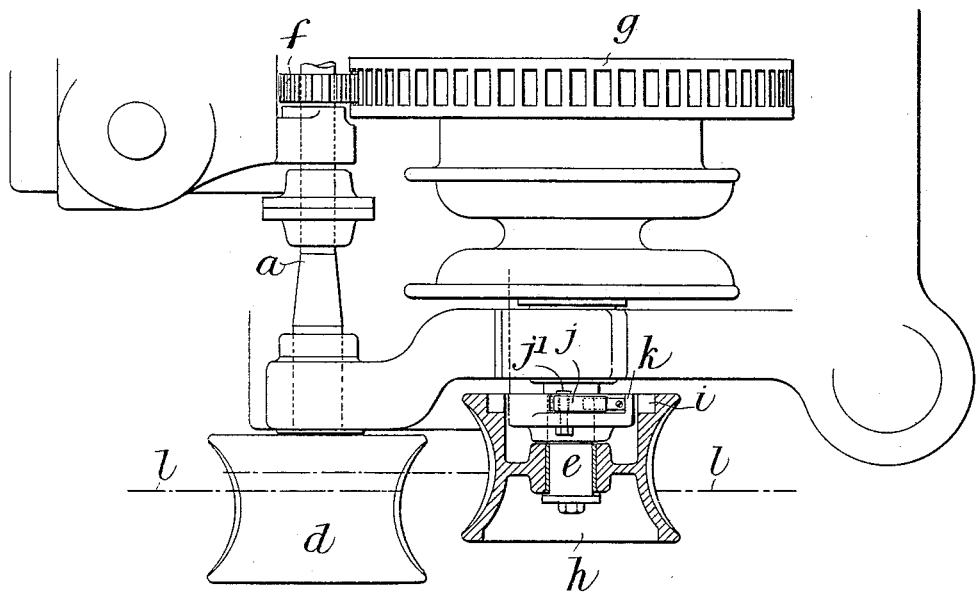

In the accompanying drawings, Figure 1 is a sectional view illustrating a windlass made according to the invention, and Fig. 2 is a sectional plan view of the windlass.

$a$ is the intermediate shaft, which is adapted to be driven from the engine-shaft through the medium of the gear-wheels $b$ and $c$, and $d$ is the warping drum or barrel, which is keyed upon the said shaft $a$ and is of ordinary construction.

$e$ is the main windlass-shaft, the said shaft being arranged to be driven from the counter-shaft $a$, through the medium of the gear-wheels $f\,g$, at a less speed than the said shaft $a$ rotates.

$h$ is the warping drum or barrel, which is loosely mounted upon the shaft $e$ and is provided, as above described, with means whereby it is rotated by the said shaft $e$ when the latter revolves in the direction shown by the arrow in Fig. 1. The means which can be suitably employed in practice and which are illustrated in the drawings comprise an internal ratchet $i$, formed in the barrel or drum $h$, and spring-pawls $j\,j$, which said pawls are hinged at $j'\,j'$ to a collar or flange $k$ or the like rigidly secured to the shaft $e$.

$l$ is the rope, which passes around the drum $h$, and thence around the drum $d$ in the opposite direction, as clearly shown in the two figures. With this arrangement the rope $l$ is normally wound by the barrel $d$, the barrel $h$ upon the main shaft $e$ overrunning its driving-pawls $j\,j$. Directly, however, the load on the counter-shaft barrel $d$ becomes too great it is taken up by the main-shaft barrel $h$, which is then driven by the pawls, the rope slipping on the barrel $d$.

Having now particularly described and ascertained the nature of my said invention and in what manner the same is to be performed, I declare that what I claim is—

1. In a windlass, the combination with a counter-shaft, of a warping-drum on said shaft, a main shaft operatively connected to and rotating slower than the counter-shaft, a main warping-drum on said main shaft and means for operatively connecting said main shaft and drum, for rotating the said main drum in one direction, but permitting said main shaft to rotate with respect to the main drum, in the opposite direction substantially as described.

2. In a windlass, the combination with a counter-shaft, of a warping-drum fixed on said shaft, a main shaft, gearing connecting the two shafts for driving the main shaft at lower speed than the counter-shaft, a main warping-drum on said main shaft, and a pawl-and-ratchet mechanism operatively connecting said main shaft and main drum for driving said drum in one direction, substantially as described.

3. In a windlass, the combination with a counter-shaft, of a warping-drum fixed to said shaft, a main shaft parallel to the counter-shaft, gearing connecting the two shafts for driving the main shaft at lower speed than the counter-shaft, a main warping-drum loosely mounted on the main shaft in line with the drum on the counter-shaft and provided with an internal ratchet and pawls secured to the main shaft for engaging said ratchet, substantially as described.

WILLIAM HORATIO HARFIELD.

Witnesses:
F. B. POPE,
W. F. DUNTON.